United States Patent

Darling-Owen et al.

[11] Patent Number: 5,944,627
[45] Date of Patent: Aug. 31, 1999

[54] PISTON WITH TWO PISTON MEMBERS FOR TRANSMISSION SERVO ASSEMBLY

[75] Inventors: Douglas L. Darling-Owen, Dummerston; Scott C. Jackson, Bellows Falls, both of Vt.

[73] Assignee: Sonnax Industries, Inc., Bellows Falls, Vt.

[21] Appl. No.: 08/987,088

[22] Filed: Dec. 9, 1997

[51] Int. Cl.⁶ .................................................. F16H 48/30
[52] U.S. Cl. ........................... 475/146; 188/77 W; 92/84; 192/86
[58] Field of Search .......................... 475/146; 188/77 R, 188/77 W; 92/84, 130, 171.7, 52, 65; 192/86

[56] References Cited

U.S. PATENT DOCUMENTS

| | | | |
|---|---|---|---|
| 3,811,364 | 5/1974 | Harkrader | 92/130 X |
| 4,388,986 | 6/1983 | Umezawa | 188/77 R |
| 4,601,233 | 7/1986 | Sugano | 92/52 |
| 4,787,494 | 11/1988 | Ogasawara et al. | 192/86 |
| 4,881,453 | 11/1989 | Armstrong | 188/77 R X |
| 4,901,605 | 2/1990 | Taguchi | 475/146 X |
| 4,930,373 | 6/1990 | Nakawaki et al. | 188/77 R X |
| 5,235,899 | 8/1993 | Hauser | 188/171.1 X |

*Primary Examiner*—Rodney H. Bonck
*Assistant Examiner*—Ha Ho
*Attorney, Agent, or Firm*—Larson & Taylor

[57] ABSTRACT

A replacement mechanism or servo assembly for applying a band to an input member of an automatic transmission includes a housing in which an apply piston is located and to which an apply pin is connected. The piston is sealably movable in the housing and includes a major piston member having a first distal reaction face and a minor piston member integral with the major piston and having a second distal reaction face. A pressure fluid distribution device applies a working fluid against both of the first distal reaction face and the second distal reaction face in order to move the piston with the resultant force of the pressures on both reaction faces and to cause the apply pin to move toward the band to compress the band about the input member with this resultant force. In a preferred embodiment, the housing further includes a pressure separator immovably disposed between the first distal reaction face and an adjacent second proximal face of the minor piston member. The pressure fluid distribution device includes a first passageway between the pressure separator and the housing by which fluid pressure applied against the second distal reaction face is also applied against the first distal reaction face, and a relief distribution device which includes a second passageway between the major piston and the minor piston by which a relief pressure provided against the second proximal face is also provided against the first proximal face.

16 Claims, 2 Drawing Sheets

(PRIOR ART) *FIG. 1*

PISTON WITH TWO PISTON MEMBERS FOR TRANSMISSION SERVO ASSEMBLY

FIELD OF THE INVENTION

The present invention relates generally to a servo assembly for applying a band in an automatic transmission, and more particularly to a replacement mechanism for a 4th piston mechanism of a servo assembly for a vehicle automatic transmission where the 4th piston includes two piston members.

BACKGROUND OF THE INVENTION

In prior art vehicle transmissions such as transmission 10 depicted in FIG. 1 which is typical of a THM 700 R4 (General Motors) transmission (or its replacement, 4L 60E), there is a 2–4 band 12 which is applied in both second gear and fourth gear (overdrive). Band 12 wraps about a reverse input drum or member 14 (only partially shown) and has one end anchored to a case 16 of transmission 10 by a band anchor pin 18. As known, input drum 14 is tanged to a reaction sun shell (not shown) which is splined to the reaction sun gear (not shown). Thus, when the a 2–4 band 12 is applied by the 2–4 servo assembly 20, reverse input drum 14, the reaction sun shell, and the reaction sun gear are all held stationary.

Servo assembly 20 applies band 12 in both second and fourth gears, and is used as an accumulator in third gear. In second gear, 2nd clutch fluid acts on a 2nd apply piston 22 providing sealed movement between case 16 and an inner piston housing 24. This forces a longitudinal 2–4 apply pin 26, which has a proximal end 28 in engagement with a receiving stop 30 on band 12, to move axially and hence to compress 2–4 band 12 and stop reverse input drum 14 from rotation. The apply rate or force of 2–4 band 12 in second gear is mainly controlled by the compressing of a servo cushion spring 32 and the 1–2 accumulator system working against a return spring 34. Cushion spring 32 is held in place between the cupped end of 2nd apply piston 22 and a groove provided in cushion spring retainer 36, with cushion spring retainer 36 being held movably inside of the cupped end of 2nd apply piston 22 by retainer ring 38 as shown.

In third gear, 2–4 servo assembly 20 releases the force of apply pin 26 against stop 30 by channeling 3rd accumulator fluid against cushion spring retainer 36 causing and hence to counteract 2nd clutch fluid pressure against 2nd apply piston 22. This 3rd accumulator fluid also seats an accumulator exhaust checkball as known (not shown). The force of 3rd accumulator fluid and of cushion spring 32 overcomes 2nd clutch fluid pressure. Thus, 2nd apply piston 22 and apply pin 26 move away from band 12 to release band 12 from the reverse input drum 14. 3rd accumulator fluid acting on 2nd apply piston 22 also acts as an accumulator to help control the apply rate of the 3–4 clutch as known (not shown).

In fourth gear, 4th clutch fluid is fed through the hollow distal end of apply pin 26 and out of the end thereof against 4th apply piston 40. 4th apply piston 40 is mounted inside of a 2–4 cover or housing 42. Housing 42 is held in place in case 16 against inner piston housing 24 by a retaining ring 44, and is sealed to case 16 using a seal 45. Apply pin 26 is connected to 4th apply piston 40 by an apply pin spring 46 compressed between 2nd apply piston 22 and a washer 50 held on apply pin 22 by a snap ring 52. This added pressure force from the 4th clutch fluid, in addition to the 2nd clutch fluid pressure still present on 2nd apply piston 22, overcomes the pressure from cushion spring 32 and the 3rd accumulator fluid. This moves 4th apply piston 40 and 2–4 apply pin 26 toward band 12 to apply band 12 and obtain fourth gear.

While servo assembly 20 performs satisfactory when new, over time the transmission loosens, hydraulic pressures decrease as pumps are less efficient, and seals leak. Consequently, such transmissions are prone to sluggish 3rd to 4th gear upshifts.

SUMMARY OF THE INVENTION

In accordance with the present invention, a replacement mechanism or servo assembly for applying a band to an input member of an automatic transmission is provided. The assembly includes an apply pin extending longitudinally with a distal end and a proximal end which engages the band. The apply pin is moved toward and away from the band to compress and loosen the band about the input member. Both the mechanism and assembly include a housing in which the distal end of the apply pin is located and from which the proximal end of the apply pin extends. A piston is located in the housing to which the apply pin is connected in order to move the apply pin. The piston is movable in the housing and is formed of two piston members. In particular, the piston includes: (a) a major piston member having a first distal reaction face and a first proximal face, (b) a first seal between the major piston member and the housing, (c) a minor piston member integral with the major piston and having a second distal reaction face and a second proximal face, and (d) a second seal between the minor piston member and the housing. A fluid distribution means applies a working fluid against both of the first distal reaction face and the second distal reaction face in order to move the piston and cause the apply pin to move toward the band to compress the band about the input member.

In a preferred embodiment, the housing further includes a pressure separator immovably disposed between the first distal reaction face and the second proximal face. This pressure separator has a third proximal face and a third distal face. A third seal is then provided between the pressure separator and the major piston.

In the preferred embodiment, the fluid distribution means includes a first passageway between the pressure separator and the housing by which fluid pressure applied against the second distal reaction face is also applied against the first distal reaction face, and a second passageway between the major piston and the minor piston by which a relief pressure provided to the second proximal face is also provided to the first proximal face.

Also in the preferred embodiment, the minor piston includes a minor tube extending proximally. The major piston then includes a central tube extending distally and about the minor tube, with a distal end which contacts the proximal face of the minor piston member. The third seal is then provided between the major tube and an inner circumferential portion of the pressure separator.

Further in the preferred embodiment, a washer is provided about the apply pin and rests against the proximal face of the main piston member. A removable holding means is also provided for releasably holding the pressure separator in the housing.

It is an advantage of the present invention that a piston of a servo assembly of a transmission, and in particular a 4th piston of a transmission or the like, is provided with two piston members whereby a dramatic increase in the reaction face surface area of the piston is achieved so that an increased holding pressure is provided to the piston.

It is also an advantage of the present invention that a replacement mechanism is provided for the 2–4 servo cover or housing and 4th apply piston of a transmission which has an increased reaction face surface area over that of the original piston such that an increased holding pressure is provided by the replacement mechanism over that original mechanism in order to prevent slippage.

It is a further advantage of the present invention that, while providing increased holding force, the replacement mechanism fits in the same radial space of the case as provided for the original 2–4 housing and takes up no more axial room than the original or takes up additional room only as there is already room provided in the original vehicle.

Other features and advantages of the present invention are stated in or apparent from detailed descriptions of presently preferred embodiments of the invention found hereinbelow.

DESCRIPTION OF THE PREFERRED EMBODIMENTS

Figure 1:
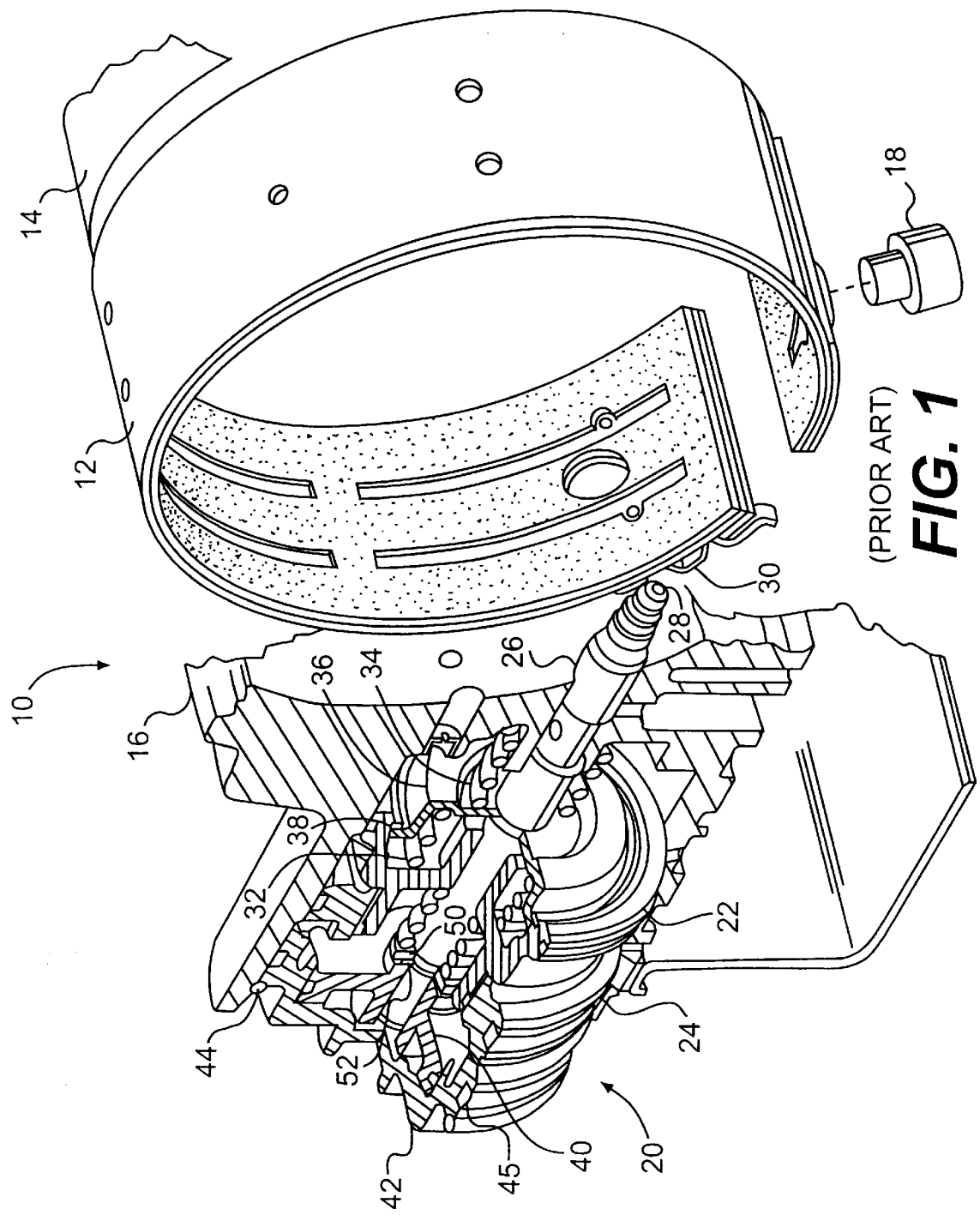
FIG. 1 is a schematic cut-away perspective view of an exploded portion of a prior art transmission to which the present invention may be applied.
Figure 2:
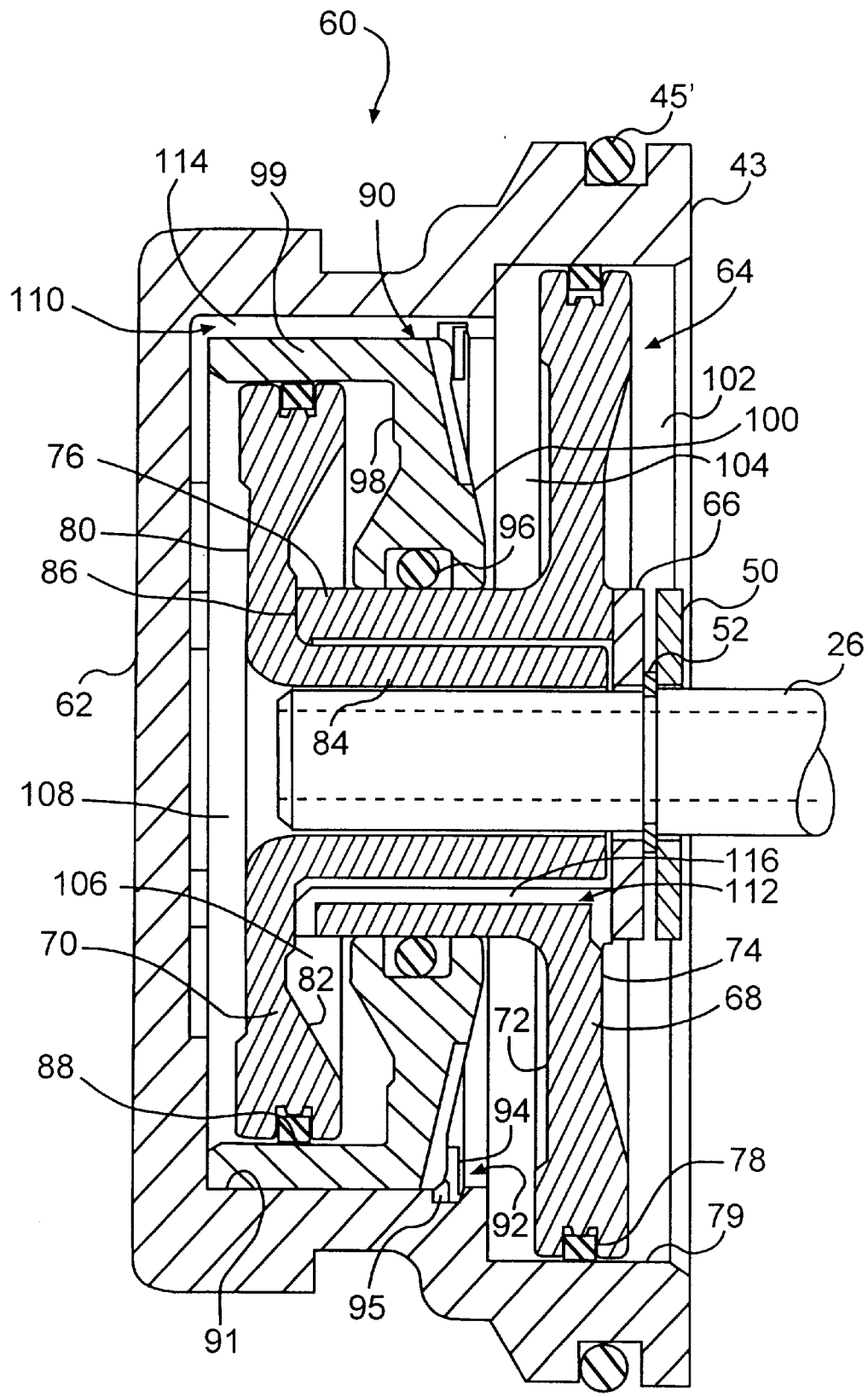
FIG. 2 is a 90° cut-away view, presented opened up like a cross sectional view, of a replacement mechanism of the present invention which is designed to replace the 4th apply piston mechanism depicted in FIG. 1.

With reference now to FIG. 2 in which like numerals represent like elements, a replacement mechanism 60 is depicted which is designed as a replacement for 2–4 housing 42 and 4th apply piston 40 of transmission 10 depicted in FIG. 1. Of course, while replacement mechanism 60 is designed for replacement with the existing transmission depicted in FIG. 1 using the same retaining ring 44, a similar seal 45' and similar abutting face 43 engaged with inner piston housing 24, mechanism 60 could also be provided as part of a new transmission such as that depicted in FIG. 1 or even generally as part of a servo assembly for any transmission where increased holding force of a transmission band by an apply pin, such as band 12 and apply pin 26, is desired.

Mechanism 60 includes a housing 62 in which the hollow distal end of hollow apply pin 26 is located. Provided in housing 62 is a 4th apply piston 64 to which the distal end of apply pin 26 is connected. For mechanism 60, this connection includes, besides the washer 50 and snap ring 52 provided as part of servo assembly 20, an additional washer 66. Washer 66 is provided in order to spread the increased holding force exerted by piston 64 (as explained below) on apply pin 26 more evenly on snap ring 52 and to prevent scarring or damage to piston 64 which would otherwise engage snap ring 52. As shown, piston 64 is made up of a major piston member 68 and an minor piston member 70.

Major piston member 68 includes a first distal reaction face 72 and a first proximal face 74. Extending distally from first distal reaction face 72 of major piston member 68 and about apply pin 26 is a major tube 76. As shown, a seal 78 is provided in an outer circumferential part of major piston member 68 which seals major piston member to a first inner wall portion 79 of housing 62 so that major piston member 68 is movable in a sealed manner with respect to housing 62.

Minor piston member 70 includes a second distal reaction face 80 and a second proximal face 82. Extending proximally from second proximal face 82 of minor piston member 70, immediately adjacent and about apply pin 26, and inside of major tube 76 is a minor tube 84. It will be appreciated that a distal end 86 of major tube 76 contacts a portion of second proximal face 82 so that minor piston member 70 and major piston member 68 are moved axially as unitary apply piston 64, and that washer 66 contacts a portion of first proximal face 74 to integrally connect apply pin 26 to apply piston 64 at all times (including during all such movements).

Provided between first distal reaction face 72 of major piston member 68 and second proximal face 82 of minor piston member 70 is a pressure separator 90. Pressure separator 90 is immovably positioned by a removable holding means 92 adjacent a second inner wall portion 91 of housing 62 and in axial abutment against the distal end of housing 62. Removable holding means 92 is conveniently formed by a snap ring 94 and a groove 95 in second wall portion 91. By use of removable holding means 92, it is easy to assemble minor piston member 70 and pressure separator 90 in housing 62, followed by the easy insertion of major piston member 68.

Pressure separator 90 is broadly cup shaped and includes a third distal face 98, a third proximal face 100, and an outer rim wall 99. As shown, a seal 88 is provided in an outer circumferential part of minor piston member 70 which movably seals minor piston member 70 to an inner surface of rim wall 99 of pressure separator 90 so that minor piston member 70 is movable in a sealed manner with respect to rim wall 99 and hence movable as well with respect to housing 62. A seal 96 is also provided in an inner circumferential portion of pressure separator 90 which movably seals pressure separator 90 to major tube 76 of major piston member 68 so that major piston member 68 is movable as well with respect to pressure separator 90 (and together with minor piston member 70).

It will be appreciated that major piston member 68, pressure separator 90 and minor piston member 70 divide housing 62 into first relief chamber 102, first pressure chamber 104, second relief chamber 106 and second pressure chamber 108. In order for major piston member 68 and minor piston member 70 to function as unitary apply piston 64, it is necessary to provide fluid communication between pressure chambers 104 and 108 as well as fluid communication between relief chambers 102 and 106. This communication is needed so that pressurized fluid normally delivered by the fluid control and distribution valve system of servo assembly 20 of transmission 10 is evenly applied to both pressure chambers 104 and 108, and that relief pressure normally provided is also equally provided to both relief chambers 102 and 106.

Thus, mechanism 60 includes a pressure fluid distribution means 110 and a relief distribution means 112. Fluid distribution means 110 conducts the pressurized fluid normally delivered up through the center of apply pin 26, and hence delivered directly to second pressure chamber 108 and applied to second distal reaction face 80 of minor piston member 70, to first pressure chamber 104 so that this pressurized fluid is applied against first distal reaction face 72 of major piston member 68 as well. Conveniently, pressure fluid distribution means 110 comprises a series (such as six) of axial pressure channels 114 (only one of which is shown) distributed equally about the outer circumferential face of pressure separator 90.

Relief distribution means 112 provides the relief pressure of servo assembly 20, normally present in the space below apply piston 64 and hence with mechanism 60 in first relief chamber 102 and present on first proximal face 74 of major piston member 68, to second relief chamber 106 so that this relief pressure is present on second proximal face 82 of minor piston member 70 as well. Conveniently, relief fluid distribution means 112 comprises a series (such as three) of axial relief channels 116 (only one of which is shown) distributed equally about the inner circumferential face of major piston member 68 (though obviously, these relief channels could easily or additionally be provided in minor piston member 70 instead).

With pressure fluid distribution means 110, relief distribution means 112, major piston member 68, pressure separator 90 and minor piston member 70, the 4th clutch fluid pressure is applied against both first distal reaction face 72 and second distal reaction face 80. Thus, the total pressure force exerted against apply piston 64 (comprising major piston member 68 and minor piston member 70 acting as a unit) is the sum of the pressure forces acting on first and second distal reaction faces 72 and 80. This total pressure force is thus some 40% more than would be acting against 4th apply piston 40 of servo assembly 20 having only the single reaction face.

While the present invention has been described with respect to exemplary embodiments thereof, it will be understood by those of ordinary skill in the art that variations and modifications can be effected within the scope and spirit of the invention.

We claim:

1. A servo assembly for applying a band to an input member of an automatic transmission comprising:

an apply pin extending longitudinally with a distal end and a proximal end which engages the band, said apply pin being moved toward and away from the band to compress and loosen the band about the input member;

a housing in which said distal end of said apply pin is located and from which said proximal end of said apply pin extends, said housing including a pressure separator immovably disposed therein;

a piston located in said housing to which said apply pin is connected in order to move said apply pin, said piston being movable in said housing and including a major piston member having a first distal reaction face facing said pressure separator, a first proximal face, and a major tube extending distally, a first seal between said major piston member and said housing, a minor piston member integral with said major piston member and having a second distal reaction face, a second proximal face facing said pressure separator, and a minor tube extending proximally within said major tube such that a distal end of said major tube contacts said second proximal face, a second seal between said minor piston member and said pressure separator, and a third seal provided between said major tube and an inner circumferential portion of said pressure separator; and a fluid distribution means for applying a working fluid against both of said first distal reaction face and said second distal reaction face in order to move said piston and cause said apply pin to move toward the band to compress the band about the input member, said fluid distribution means including a first passageway between said pressure separator and said housing by which fluid pressure applied against said second distal reaction face is also applied against said first distal reaction face, and a second passageway between said major piston member and said minor piston member by which a relief pressure provided against said second proximal face is also provided against said first proximal face.

2. A servo assembly as claimed in claim 1:

further including a washer provided about said apply pin and resting against said proximal face of said major piston member.

3. A servo assembly as claimed in claim 2:

further including a removable holding means for releasably holding said pressure separator in said housing.

4. A replacement mechanism for a 4th piston mechanism of a servo assembly, which servo assembly moves a longitudinal apply pin such that a proximal end extending from the servo assembly engages a 2–4 band to compress and loosen the 2–4 band about an input member of an automatic transmission, said replacement assembly comprising:

a housing in which a distal end of the apply pin is located, said housing including a pressure separator immovably disposed therein;

a 4th piston located in said housing to which the distal end of the apply pin is connected in order to move the apply pin to engage a 4th gear of the transmission, said 4th piston being movable in said housing and including a major piston member having a first distal reaction face facing said pressure separator, a first proximal face, and a major tube extending distally, a first seal between said major piston member and said housing, a minor piston member integral with said major piston member and having a second distal reaction face, a second proximal face facing said pressure separator, and a minor tube extending proximally within said major tube such that a distal end of said major tube contacts said second proximal face, a second seal between said minor piston member and said pressure separator, and a third seal provided between said major tube and an inner circumferential portion of said pressure separator; and a fluid distribution means for applying a working fluid of the transmission against both of said first distal reaction face and said second distal reaction face in order to move said 4th piston and cause the apply pin to move toward the 2–4 band to compress the 2–4 band about the input member, said fluid distribution means including a first passageway between said pressure separator and said housing by which fluid pressure applied against said second distal reaction face is also applied against said first distal reaction face, and a second passageway between said major piston member and said minor piston member by which a relief pressure provided against said second proximal face is also provided against said first proximal face.

5. A replacement mechanism as claimed in claim 4:

further including a washer provided about said apply pin and resting against said proximal face of said major piston member.

6. A replacement mechanism as claimed in claim 5:

further including a removable holding means for releasably holding said pressure separator in said housing.

7. A servo assembly for applying a band to an input member of an automatic transmission comprising:

an apply pin extending longitudinally with a distal end and a proximal end which engages the band, said apply pin being moved toward and away from the band to compress and loosen the band about the input member;

a housing in which said distal end of said apply pin is located and from which said proximal end of said apply pin extends, said housing including a pressure separator immovably disposed therein;

a piston located in said housing to which said apply pin is connected in order to move said apply pin, said piston being movable in said housing and including a major piston member having a first distal reaction face facing said pressure separator, a first proximal face, and a major tube extending distally, a first seal between said major piston member and said housing, a minor piston member integral with said major piston member and having a second distal reaction face, a second proximal face facing said pressure separator, and a minor tube extending proximally such that an inner one of said major and minor tubes is within an outer one of said major and minor tubes and such that said major and minor piston members abut one another, a second seal between said minor piston member and said pressure separator, and a third seal provided between the outer one of said major and minor tubes and an inner circumferential portion of said pressure separator; and a fluid distribution means for applying a working fluid against both of said first distal reaction face and said second distal reaction face in order to move said piston and cause said apply pin to move toward the band to compress the band about the input member.

8. A servo assembly as claimed in claim 7:

wherein said fluid distribution means includes a first passageway between said pressure separator and said housing by which fluid pressure applied against said second distal reaction face is also applied against said first distal reaction face, and a second passageway between said major piston member and said minor piston member by which a relief pressure provided against said second proximal face is also provided against said first proximal face.

9. A servo assembly as claimed in claim 7:

wherein said major tube extends about said minor tube; and wherein said third seal is provided between said major tube and the inner circumferential portion of said pressure separator.

10. A servo assembly as claimed in claim 7:

further including a washer provided about said apply pin and resting against said proximal face of said major piston member.

11. A servo assembly as claimed in claim 7:

further including a removable holding means for releasably holding said pressure separator in said housing.

12. A replacement mechanism for a 4th piston mechanism of a servo assembly, which servo assembly moves a longitudinal apply pin such that a proximal end extending from the servo assembly engages a 2–4 band to compress and loosen the 2–4 band about an input member of an automatic transmission, said replacement assembly comprising:

a housing in which a distal end of the apply pin is located, said housing including a pressure separator immovably disposed therein;

a 4th piston located in said housing to which the distal end of the apply pin is connected in order to move the apply pin to engage a 4th gear of the transmission, said 4th piston being movable in said housing and including a major piston member having a first distal reaction face facing said pressure separator, a first proximal face, and a major tube extending distally, a first seal between said major piston member and said housing, a minor piston member integral with said major piston member and having a second distal reaction face, a second proximal face facing said pressure separator, and a minor tube extending proximally such that an inner one of said major and minor tubes is within an outer one of said major and minor tubes and such that said major and minor piston members abut one another, a second seal between said minor piston member and said pressure separator, and a third seal provided between the outer one of said major and minor tubes and an inner circumferential portion of said pressure separator; and a fluid distribution means for applying a working fluid of the transmission against both of said first distal reaction face and said second distal reaction face in order to move said 4th piston and cause the apply pin to move toward the 2–4 band to compress the 2–4 band about the input member.

13. A replacement mechanism as claimed in claim 12:

wherein said fluid distribution means includes a first passageway between said pressure separator and said housing by which fluid pressure applied against said second distal reaction face is also applied against said first distal reaction face, and a second passageway between said major piston member and said minor piston member by which a relief pressure provided against said second proximal face is also provided against said first proximal face.

14. A replacement mechanism as claimed in claim 12:

wherein said major tube extends about said minor tube; and wherein said third seal is provided between said major tube and the inner circumferential portion of said pressure separator.

15. A replacement mechanism as claimed in claim 12:

further including a washer provided about said apply pin and resting against said proximal face of said major piston member.

16. A replacement mechanism as claimed in claim 12:

further including a removable holding means for releasably holding said pressure separator in said housing.

\* \* \* \* \*